April 25, 1944.　　　C. G. CURTIS　　　2,347,465
TWO-CYCLE GAS ENGINE
Filed Nov. 5, 1942　　　2 Sheets-Sheet 1

INVENTOR
CHARLES G. CURTIS
BY G. W. Thompson
ATTORNEY

INVENTOR
CHARLES G. CURTIS

Patented Apr. 25, 1944

2,347,465

UNITED STATES PATENT OFFICE 2,347,465

TWO-CYCLE GAS ENGINE

Charles G. Curtis, New York, N. Y.

Application November 5, 1942, Serial No. 464,561

3 Claims. (Cl. 123—65)

The object I have in view is to provide an internal combustion engine operating on natural gas or other gaseous fuel which will enable the combustion of such fuel to be carried on with maximum efficiency and so as to give the maximum power. This I accomplish in a two-cycle engine by introducing the gas into the cylinder in the early part of the compression stroke, and by setting up during the scavenging process turbulence in the air column, preferably in the form of a swirl or rotational movement which continues after scavenging has ceased and lasts during the compression stroke so as to bring about a thorough mixture of the gas and air before ignition starts.

In the accompanying drawings I have shown this method of operation as applied to the uniflow type of engine and also as applied to the port-scavenged type, particularly to the Curtis type of scavenging.

Figure 1:
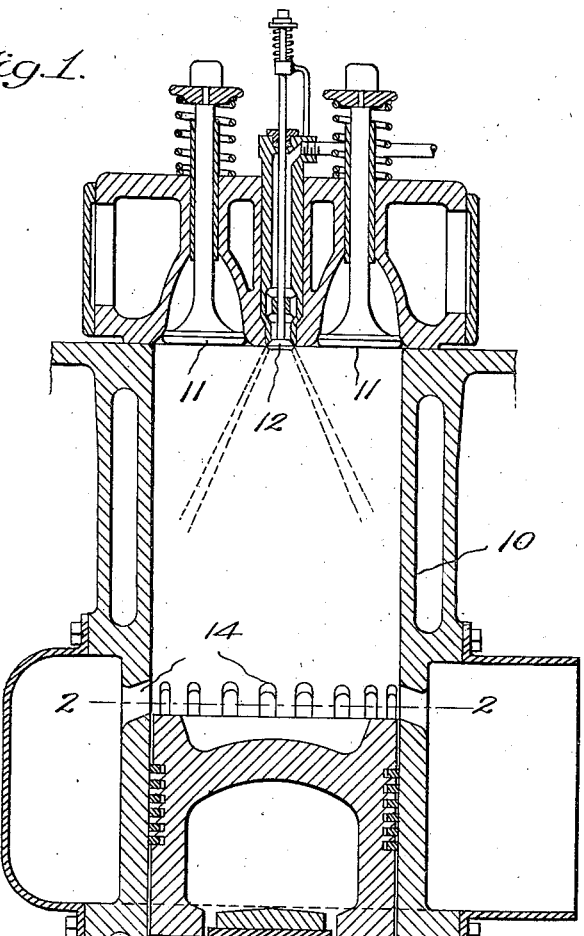
Fig. 1 is a vertical sectional view illustrating one embodiment of my invention.
Figure 2:
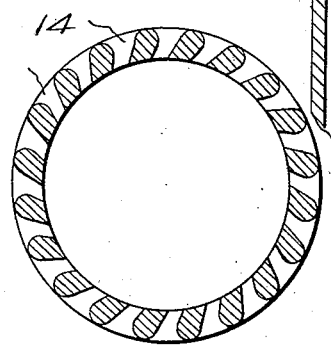
Fig. 2 is a transverse section on line 2—2, Fig. 1.

In Figure 1, numeral 10 represents a cylinder of the uniflow type with inlet ports 14 extending all the way around at the bottom and one or more exhaust valves 11 at the top of the cylinder, the scavenging air coming in at the bottom of the cylinder flowing upward and passing out through the exhaust valves. 12 is a spray nozzle for introducing the gas which is usually made in the form of a small poppet valve which delivers the stream of gas into the cylinder in the form of a hollow cone. This valve 12 is operated from a camshaft in the usual way and is arranged to open at or near the end of the scavenging period and remains open so as to let in sufficient gas during a portion of the compression stroke. I have found that when gas is introduced in this way into a cylinder of the usual port-scavenged type, there is very inadequate mixture of the gas and air and the result is that the mixture is striated and the combustion is imperfect or irregular and detonation is apt to occur and the efficiency is thereby impaired. To overcome this difficulty in the uniflow type of engine, I arrange the inlet ports at an angle so as to produce a substantial turbulence or rotational effect in the column of air during scavenging. As the gas enters the cylinder it encounters the swirling column of air and the gas stream is broken up and becomes thoroughly mixed with the air by the time the compression stroke has been completed and the combustion starts. By establishing a swirl which persists after scavenging and by bringing in the fuel in the early part of the compression stroke, I am enabled to utilize the major part of the compression stroke to bring about a complete mixing of the gas and air before combustion starts. This will give a very efficient and reliable combustion.

Figure 3:
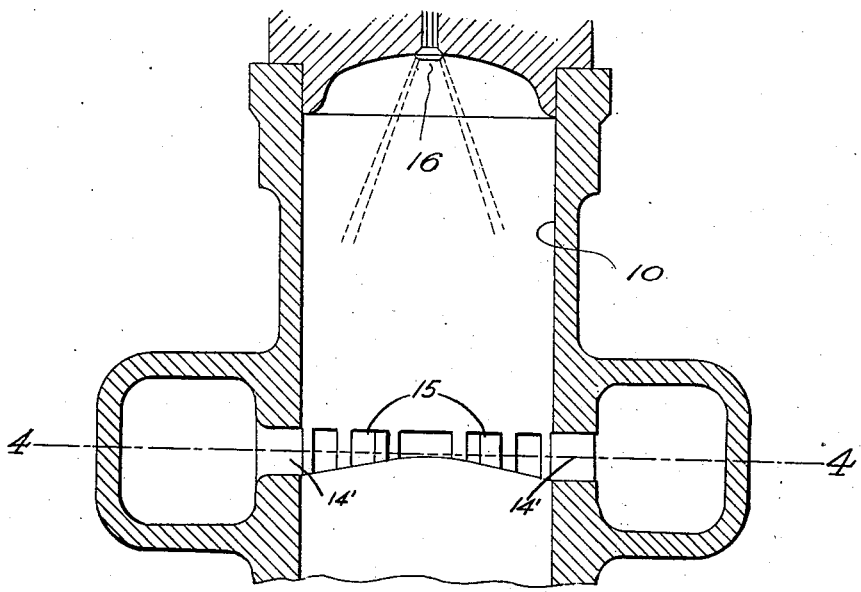
Fig. 3 is a vertical sectional view illustrating another embodiment of my invention.
Figure 4:
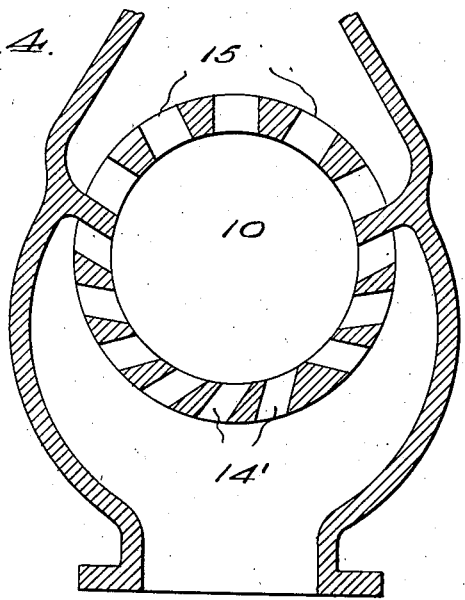
Fig. 4 is a transverse section on line 4—4, Fig. 3.

In the case of a port-scavenged engine, Figs. 3 and 4, 14' represents the inlet ports and 15 the exhaust ports, the gas being injected through the nozzle 16 in the usual way.

Fig. 4 shows the arrangement of ports 14' and 15 in the Curtis system of port scavenging. In this case in order to secure the necessary turbulence or rotation of the column, I arrange the ports so that they are unbalanced, that is, that the volume or velocity entering the side ports on one side is greater than that entering the side ports on the other side. This may be done by making the ports on one side of greater area than those on the other, or by having higher pressure back of the one side of the end ports as compared with that at the other end, or it may be done by changing the angle of the middle ports, as shown in Fig. 4 and as described in patent to Curtis and Newton No. 1,858,002.

I have found that by an unbalanced arrangement of this kind, if not too much out of balance, a considerable swirl can be given to the column of air during the scavenging and this swirl will persist during the compression stroke so that when the fuel is injected into the cylinder it will meet the swirling column and become much better mixed than would otherwise be possible.

I prefer, however, the uniflow type because by arranging the ports at a considerable angle to the radius a vigorous swirl to the column of air may be had enough to break up all the gas which comes down from above through the spray nozzle. Instead of introducing the fuel at the top or in the form of a hollow cone, it may be introduced at other points in the cylinder, for example: on the side of the cylinder a little ways above the inlet ports. If this is injected in radially or in the direction against the swirl of the air, the gas and air will become well mixed. By placing the gas inlet ports at the right height above the inlet ports, the piston will operate to cut off the flow of gas so that it will not be necessary to close the valve controlling the gas flow so quickly. This will enable the fuel rate of flow to be kept up and suddenly cut off by the movement of the piston.

I claim:

1. In a two-cycle internal combustion engine comprising a cylinder and a piston, scavenging ports adapted to produce a swirl or rotation in the column of scavenging air within the cylinder which persists throughout compression after scanvenging is completed, in combination with means for injecting a gas jet or stream into the swirling air in the early part of the compression stroke so that the air and gas becomes thoroughly mixed during the compression stroke.

2. In a uniflow type of two-cycle internal combustion engine comprising a cylinder and a piston, inclined inlet ports for introducing scavenging air and for giving a swirl or rotational movement to the column of air within the cylinder which persists throughout compression after scavenging is completed, in combination with means for injecting a gas jet or stream into the swirling air in the early part of the compression stroke so that the air and gas become thoroughly mixed during the compression stroke.

3. In a uniflow type of two-cycle internal combustion engine comprising a cylinder and a piston, inclined inlet ports for introducing scavenging air and for giving a swirl or rotational movement to the colunm of air within the cylinder which persists throughout compression after scavenging is completed, in combination with means for injecting a gas jet or stream in the form of a hollow cone into the swirling air in the early part of the compression stroke so that the air and gas become thoroughly mixed during the compression stroke.

CHARLES G. CURTIS.